(12) United States Patent
Kustermann et al.

(10) Patent No.: US 6,977,011 B2
(45) Date of Patent: Dec. 20, 2005

(54) ROLLER PROVIDED FOR USE IN COATING MACHINES

(75) Inventors: Martin Kustermann, Heidenheim (DE); Michel Beltzung, Baden (AT); Thomas Stübegger, Pitten (AT)

(73) Assignee: Voith Paper Patent GmbH, Heidenheim (DE)

( * ) Notice: Subject to any disclaimer, the term of this patent is extended or adjusted under 35 U.S.C. 154(b) by 0 days.

(21) Appl. No.: 10/667,195

(22) Filed: Oct. 7, 2003

(65) Prior Publication Data

US 2004/0069219 A1 Apr. 15, 2004

Related U.S. Application Data

(63) Continuation-in-part of application No. 09/763,032, filed on Feb. 15, 2001, now abandoned.

(30) Foreign Application Priority Data

Jun. 18, 1999 (DE) .............................. 199 27 902
Dec. 28, 2000 (EP) ..................... PCT/EP00/05568

(51) Int. Cl.[7] .............................................. B05C 1/08
(52) U.S. Cl. .............................. 118/261; 118/DIG. 15; 118/249

(58) Field of Search ....................... 118/227, 249, 261, 118/DIG. 14, DIG. 15; 162/265, 266; 492/49, 492/56, 58, 59

(56) References Cited

U.S. PATENT DOCUMENTS

| | | | |
|---|---|---|---|
| 3,701,335 A | 10/1972 | Barnscheidt | 118/104 |
| 4,559,106 A | 12/1985 | Skytta et al. | 162/358 |
| 5,415,612 A | 5/1995 | Carlson et al. | 492/56 |
| 5,650,010 A | 7/1997 | Rantanen et al. | 118/126 |
| 5,656,344 A * | 8/1997 | Sawa et al. | 428/36.5 |

FOREIGN PATENT DOCUMENTS

| | | | |
|---|---|---|---|
| DE | 40 22 334 C2 | 2/1994 | D21H 23/58 |
| DE | 691 12 779 T2 | 6/1995 | B05D 5/02 |
| DE | 197 14 645 A1 | 10/1998 | B05C 1/08 |
| DE | 198 00 955 A1 | 7/1999 | D21H 23/56 |
| EP | 0 466 007 B1 | 1/1995 | B05C 1/08 |

* cited by examiner

*Primary Examiner*—Brenda A. Lamb
(74) *Attorney, Agent, or Firm*—Taylor & Aust, P.C.

(57) ABSTRACT

A roller is provided for use in coating machines. The roller directly or indirectly applies a liquid or pasty medium to one or both sides of a running web of material, especially one made of paper or paperboard. The roller includes a core whose outer casing is provided with a covering made of an elastomeric material. The covering is designed such that it can be compressed.

37 Claims, 2 Drawing Sheets

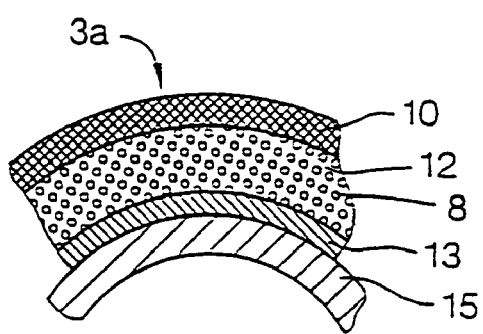
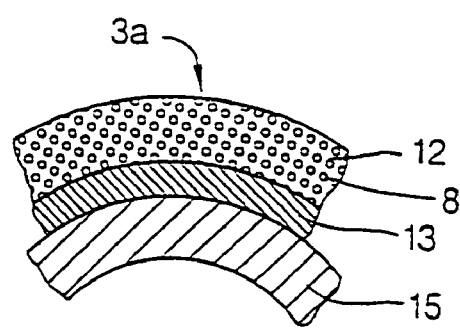
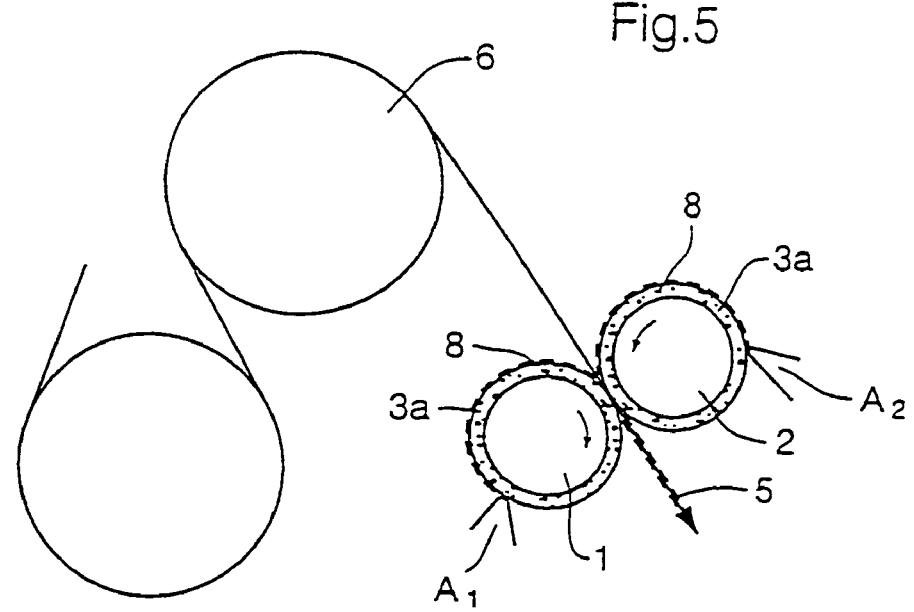

ROLLER PROVIDED FOR USE IN COATING MACHINES

CROSS REFERENCE TO RELATED APPLICATIONS

This is a continuation-in-part of U.S. patent application Ser. No. 09/763,032, entitled "ROLLER PROVIDED FOR USE IN COATING MACHINES", now abandoned filed Feb. 15, 2001.

BACKGROUND OF THE INVENTION

1. Field of the Invention

The invention relates to a roll for coating machines for the direct or indirect application of a liquid or pasty medium to one or both sides of a moving web, in particular one of paper or board.

2. Description of the Related Art

A known roll for coating machines for the direct or indirect application of a liquid or pasty medium to one or both sides of a moving web has either a hollow cylindrical or a solid core and is made of metal or fibre-reinforced plastic. The outer circumference of the core is provided with an elastomeric layer, formed of rubber, polyurethane or similar material. Such a roll is assigned a suitable applicator unit and is employed in the on-line or off-line coating machine during papermaking or paper conversion.

In the case of direct application, the roll constitutes an opposing element for supporting and guiding the moving web. In this case, reference should be made to U.S. Pat. No. 3,701,335. A coating roll interacting with a doctor rod includes a metallic core, which has two elastomer outer layers of different thickness and hardness. These layers are incompressible.

In the indirect application process, on the other hand, the liquid or pasty medium is applied to the surface of the roll (applicator roll), the roll subsequently transferring the medium to the web in a press nip through which the web runs. In practice, this apparatus is referred to, for example, as a film press, speedsizer or speedcoater.

In this case, too, rubber-covered applicator rolls or those coated with polyurethane or similar material are used for this purpose. These so-called solid elastomer rolls are pressed against each other with a defined loading, as already mentioned, for the purpose of forming a nip and as a result are flattened, so that the result is a nip broadened by an amount "a". As a result of this broadened nip, improved transfer of the medium is achieved.

Such a broad nip advantageously also leads to a certain dewatering of the liquid medium and therefore for the most part permits higher coating applications than in the case of a "sharper" nip.

However, the disadvantage of the solid elastomer which outweighs the advantages, is that because of its incompressibility (constancy of volume), in particular upstream and downstream of the nip, a bead is formed as a consequence of the displacement of the elastomeric material. The same negative effect also occurs when a doctor element is pressed against the roll which is formed as an opposing roll and guides the web.

In this case, the bead formation upstream of the nip is greater than that downstream of the nip and, as a result, can even damage the web running into the nip.

SUMMARY OF THE INVENTION

The invention provides a roll with which the formation of a bead damaging the web can be reduced or even avoided and therefore ensures better application results.

Instead of the incompressible solid elastomer previously used, according to the invention a compressible but nevertheless resilient covering is provided for the roll. The invention is particularly suitable for applicator rolls in the indirect application of an application medium, since here the broadened nip action mentioned at the beginning occurs. The compressibility is achieved by the covering, in particular the intermediate layer, containing an elastomer which is known per se, into which cavities, in the form of small gas bubbles, have been introduced. These cavities may be open-celled (e.g., PU foam) or else closed.

The cavities can be produced, for example, by foaming the material provided as the covering layer. For this purpose, this material can have added to it such powdery materials as $NaHCO_3$, which become gaseous, for example during vulcanization, and therefore lead to foaming. In the case of polyurethane (PU), water molecules also fulfill this purpose. It is expedient with regard to the production costs if the foaming of the elastomer is performed as it is crosslinked on the roll core.

Superficially, the roll covering according to the invention appears very smooth and even, since the included cavities are only very small and cannot therefore lead to marking of the web.

The more uniformly the cavities are arranged over the length of the rolls or the web, the more uniform is its compressibility as well. Also improved are the positive effects on the surface of the coated or impregnated paper. In addition to the low paper stress, as a result the geometry at the outlet from the nip is also influenced in a beneficial way in the case of indirect application. Dispensing with the beads described at the beginning to a large extent means that the separation of the rolls, and therefore the action of pulling off the web, are better defined.

In particular at high running speeds of the web (which may be over 2000 m/min), the formation of an application-medium spray mist occurs downstream of the application point in the nip during indirect application, in particular at the point where the web lifts off the surface of the applicator roll. The application-medium particles forming this spray mist may contain both droplets of application medium which are still liquid and pasty, and already dried particles of the application medium.

In order to be able to prevent the application-medium particles of the spray mist from being deposited again on the fresh application layer, DE 198 00 955 has already proposed the arrangement of a catching device or an extraction device or the like downstream of the application point in the running direction (that is, downstream of the nip). If the roll covering according to the invention is used, it is possible to dispense with this aforementioned equipment, since in a surprising way little mist or no mist at all occurs as the web is separated, which is as a further advantage of the present invention.

FIG. 1 illustrates a pair of applicator rolls 1, 2 having associated application units A. The running direction of the rolls 1, 2 is identified by corresponding arrows. The two rolls 1 and 2 have a roll covering 3 which is resilient but incompressible and is made, for example, of solid rubber.

In the case of the material used, the contact force $F_1$ and $F_2$ applied to the two rolls 1, 2 leads to the nip $N_1$ being firstly advantageously enlarged by the amount "a" and "a'"

and in this way ensuring a long penetration phase of the medium into the web, a being greater than a'. Secondly, however, beads $W_E$ form on the inlet side and beads $W_A$ form on the outlet side of the nip $N_1$, projecting in an undesired way and therefore being capable of leading to web damage (higher frictional forces, expansion of the material web, and so on) and to non-uniform application of the medium to the web 5, since the beads, as viewed over the width of the web or the roll, do not reliably extend with the same magnitude.

In FIG. 1, dashed lines represent colour mist formation which is still arising at the nip outlet and whose negative effects have already been described.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3 is a fragmentary, side view of a multi-layer construction of the roll covering from FIG. 2 according to the invention;

FIG. 4 is a fragmentary, side view of another embodiment of a single-layer construction of the roll covering from FIG. 2 according to the invention; and FIG. 5 is a schematic side view of a coating unit with application rolls according to the invention.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
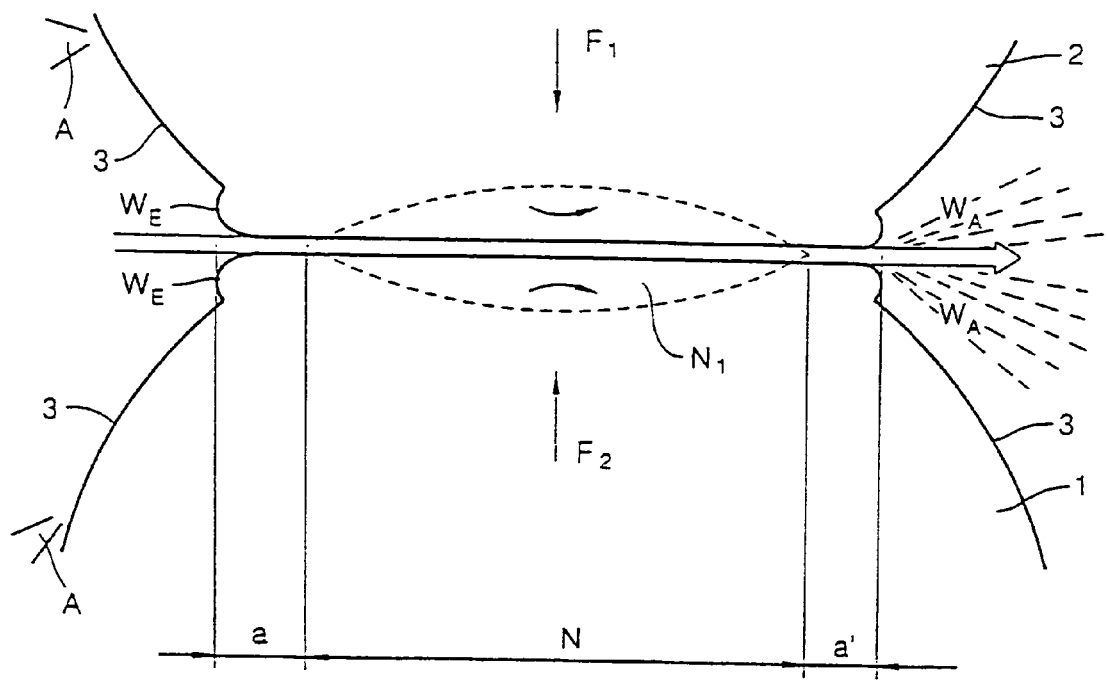
FIG. 1 is a schematic, side view of known application rolls which form beads in the nip.
Figure 2:
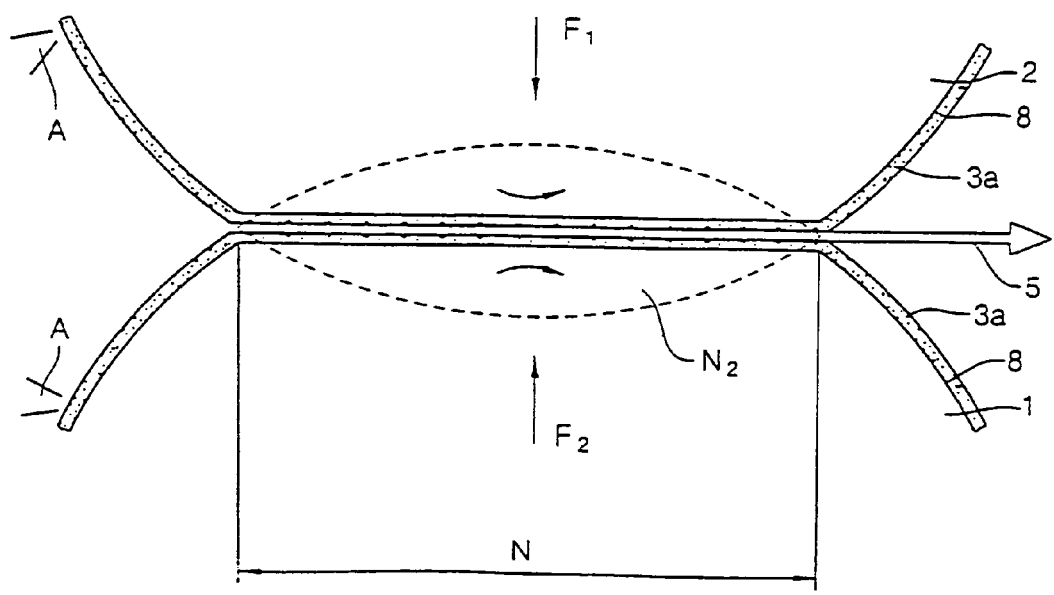
FIG. 2 is a schematic, side view of application rolls according to the invention without bead formation.

FIG. 2 shows the relationships in the nip $N_2$ of applicator rolls 1 and 2 of the present invention being used for indirect application. Applicator rolls 1 and 2 have a compressible covering or a compressible layer 3a. The compressibility of this covering permits a desired broad nip $N_2$ without beads $W_A$ and $W_E$ and without any "misting" of the medium.

The construction of the compressible roll covering 3a according to FIG. 2 is shown by FIGS. 3 and 4.

In the embodiment according to FIG. 3, the covering 3a has a multi-layer construction, including an outer layer, i.e., a so-called functional layer 10, and a lower layer, i.e., the intermediate layer 12, which is applied to the roll core 15 of the applicator roll(s) 1 and/or 2.

Roll core 15 is made of metal, a fibre-reinforced plastic, e.g., CRK (carbon fibres) or another suitable material. Roll core 15 can be produced as a solid material or to include a hollow cylinder. In order to ensure or to improve the adhesion between the roll core 15 and the covering 3a, the outer circumference of the roll core 15 is provided with a bonding layer 13, for example an adhesive coating.

The functional layer 10 is a solid elastomeric material having closed pores. The thickness $d_F$ of the functional layer 10 is approximately between 1 mm and 15 mm. Layer 12 is compressible by virtue of having cavities 8. In the case of the intermediate layer 12 being used in the multi-layer covering, the cavities 8 may have diameters of up to 2 mm. However, when the layer 12 is used for a single-layer covering (see FIG. 4), the cavities 8 are less than 30 $\mu$m in diameter, and possibly 0.5 to 5 $\mu$m in diameter, since the layer 12 at the same time constitutes the functional layer in this embodiment. Cavities 8 are of a substantially uniform size, as shown in FIGS. 3 and 4. Further, cavities 8 are substantially uniformly distributed within layer 12.

The thickness $d_K$ (thickness of the compressible layer 12) is approximately between 1 mm and 50 mm, and possibly approximately between 5 mm and 25 mm, and has a hardness of 1 to 300 P & J (Pussey & Jones Hardness), and possibly 20 to 150 P & J. The lower values are used when the rugged functional unit 10 is present, for example when penetration is desired (for example in the case of liner, packaging papers).

Depending on the required conditions in the nip $N_2$, the single layer or multi-layer covering 3a is selected with appropriate thickness such that line forces $F_1$ and $F_2$ (see FIG. 2) in accordance with the condition: 1 kN/m<$F_1$=$F_2$<100 kN/m, possibly 40 kN/m, and/or a surface pressure in the nip $N_2$ of 0.01 to 2 N/mm$^2$, possibly 0.05 to 0.5 N/mm$^2$ and/or a nip length N of 20 to 200 mm, possibly 30 to 150 mm, can be achieved. These values guarantee optimum nip conditions, and therefore the application of medium to the web is of a better quality.

FIG. 5 illustrates an indirect application of coating medium with applicator rolls. The moving web 5 leaves a drying cylinder 6 of a drying group and is then fed to a so-called speedsizer, including the two applicator rolls 1 and 2, forming the press nip N, to be treated on both sides with an application medium. The applicator rolls 1 and 2 are in this embodiment provided with the compressible covering 3a, including cavities 8. Each applicator roll 1, 2 is assigned a corresponding applicator unit $A_1$ and $A_2$ for indirect coating.

In the case of coating on only one side (not illustrated in FIG. 5), for example the roll 1 is the applicator roll with the compressible covering 3a, on which the applicator unit $A_1$ acts, and the roll 2 is then the web-supporting opposing roll. In this embodiment, it would also be possible for only the applicator roll 1 to have the compressible layer 3a on its circumference.

In the case of direct application, likewise not illustrated in FIG. 5, the roll 2 would be designed as an opposing roll and provided with a compressible covering 3a. The roll 1 would be omitted in this embodiment, and the applicator mechanism $A_1$ would move to this position for this purpose, with a doctor element for equalizing and/or final metering of the applied quantity of coating. After this, and likewise not illustrated in FIG. 5, further treatment steps of the material web 5, such as non-contact drying, drying groups and further coating stations, as well as smoothing devices, may follow.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for direct application of a coating medium to a moving fiber material web, said apparatus comprising:
   an applicator unit configured for applying the coating medium to the web; and
   a roll configured for guiding the web, said roll including:
      a core having an outer surface;
      a compressible covering formed of an elastomeric material, said elastomeric material having a plurality of substantially uniformly distributed cavities, said cavities being of a substantially uniform size; and
      a bonding layer joining said covering to said outer surface of said core, said covering including an outer functional layer and at least one intermediate layer disposed within said outer functional layer, said outer functional layer being formed of a solid elastomeric material having a thickness of approximately between 1 mm and 15 mm.

2. The apparatus of claim 1, wherein said thickness of said at least one intermediate layer is approximately between 5 mm and 25 mm.

3. The apparatus of claim 1, wherein said cavities are one of filled and open-celled.

4. The apparatus of claim 3, wherein each of said cavities has a diameter of approximately between 0.5 mm and 2 mm.

5. The apparatus of claim 1, wherein said covering is monolithic.

6. The apparatus of claim 5, wherein said covering includes a plurality of uniformly distributed cavities, said cavities being one of filled and open-celled.

7. The apparatus of claim 6, wherein each of said cavities has a diameter of less than 30 mm.

8. The apparatus of claim 6, wherein each of said cavities has a diameter of approximately between 0.5 mm and 5 mm.

9. The apparatus of claim 1, wherein said elastomeric material is crosslinked on said core, said elastomeric material being a foam material.

10. The apparatus of claim 1, wherein said compressible covering is an outer covering of said roll.

11. An apparatus for direct application of a coating medium to a moving fiber material web, said apparatus comprising:
    an applicator unit configured for applying the coating medium to the web; and
    a roll configured for guiding the web, said roll including:
       a core having an outer surface;
       a compressible covering formed of an elastomeric material, said elastomeric material having a plurality of substantially uniformly distributed cavities, said cavities being of a substantially uniform size; and
       a bonding layer joining said covering to said outer surface of said core, said covering including an outer functional layer and at least one intermediate layer disposed within said outer functional layer, said at least one intermediate layer being compressible, said at least one intermediate layer having a thickness of approximately between 1 mm and 50 mm, said at least one intermediate layer having a hardness of approximately between 1 P&J and 300 P&J.

12. The apparatus of claim 4, wherein said hardness of said at least one intermediate layer is approximately between 20 P&J and 150 P&J.

13. An apparatus, wherein for direct application of a coating medium to a moving fiber material web, said apparatus comprising:
    an applicator unit configured for applying the coating medium to the web; and
    a roll configured for guiding the web, said roll including:
       a core having an outer surface;
       a compressible covering formed of an elastomeric material, said elastomeric material having a plurality of substantially uniformly distributed cavities, said cavities being of a substantially uniform size; and
       a bonding layer joining said covering to said outer surface of said core, said covering being monolithic having a thickness of approximately between 1 mm and 50 mm, said covering having a hardness of approximately between 1 P&J and 300 P&J.

14. The apparatus of claim 13, wherein said thickness of said covering is approximately between 5 mm and 25 mm.

15. The apparatus of claim 13, wherein said hardness of said covering is approximately between 20 P&J and 150 P&J.

16. An apparatus for indirect application of a coating medium to a moving fiber material web, said apparatus comprising:
    a backing device configured for supporting the web;
    an applicator unit configured for applying the coating medium; and
    a roll defining a press nip with said backing device, said press nip being configured for receiving the web, said roll being configured for receiving the coating medium from said applicator unit and transferring the coating medium to the web in said press nip, said roll including:
       a core having an outer surface;
       a compressible covering formed of an elastomeric material, said elastomeric material having a plurality of substantially uniformly distributed cavities, said cavities being of a substantially uniform size; and
       a bonding layer joining said covering to said outer surface of said core.

17. The apparatus of claim 16, wherein said covering includes an outer functional layer and at least one intermediate layer disposed within said outer functional layer.

18. The apparatus of claim 17, wherein said outer functional layer is formed of a solid elastomeric material and has a thickness of approximately between 1 mm and 15 mm.

19. The apparatus of claim 17, wherein said at least one intermediate layer is compressible, said at least one intermediate layer having a thickness of approximately between 1 mm and 50 mm, said at least one intermediate layer having a hardness of approximately between 1 P&J and 300 P&J.

20. The apparatus of claim 19, wherein said thickness of said at least one intermediate layer is approximately between 5 mm and 25 mm.

21. The apparatus of claim 19, wherein said hardness of said at least one intermediate layer is approximately between 20 P&J and 150 P&J.

22. The apparatus of claim 17, wherein said cavities are one of filled and open-celled.

23. The apparatus of claim 22, wherein each of said cavities has a diameter of approximately between 0.5 mm and 2 mm.

24. The apparatus of claim 16, wherein said covering is monolithic.

25. The apparatus of claim 24, wherein said covering has a thickness of approximately between 1 mm and 50 mm, said covering having a hardness of approximately between 1 P&J and 300 P&J.

26. The apparatus of claim 25, wherein said thickness of said covering is approximately between 5 mm and 25 mm.

27. The apparatus of claim 25, wherein said hardness of said covering is approximately between 20 P&J and 150 P&J.

28. The apparatus of claim 24, wherein said covering includes a plurality of substantially uniformly distributed cavities, said cavities being one of filled and open-celled.

29. The apparatus of claim 28, wherein each of said cavities has a diameter of less than 30 mm.

30. The apparatus of claim 28, wherein each of said cavities has a diameter of approximately between 0.5 mm and 5 mm.

31. The apparatus of claim 16, wherein said roll and said backing device are configured to exert a line force in said press nip, said line force being approximately between 1 kN/m and 100 kN/m.

32. The apparatus of claim 31, wherein said line force is approximately 40 kN/m.

33. The apparatus of claim 16, wherein said roll and said backing device are configured to exert a surface pressure in said press nip, said surface pressure being approximately between 0.01 N/mm2 and 2 N/mm2.

34. The apparatus of claim 33, wherein said surface pressure is approximately between 0.05 N/mm2 and 0.5 N/mnm2.

35. The apparatus of claim 16, wherein said roll and said backing device are configured to be in contact at said press nip for a length in a direction of web movement, said length being approximately between 20 mm and 200 mm.

36. The apparatus of claim 35, wherein said length is approximately between 30 mm and 150 mm.

37. The apparatus of claim 16, wherein said elastomeric material is crosslinked on said core, said elastomeric material being a foam material.

\* \* \* \* \*

UNITED STATES PATENT AND TRADEMARK OFFICE
CERTIFICATE OF CORRECTION

PATENT NO. : 6,977,011 B2
DATED : December 20, 2005
INVENTOR(S) : Kustermann et al.

It is certified that error appears in the above-identified patent and that said Letters Patent is hereby corrected as shown below:

Column 5,
Line 60, delete "claim 4" and substitute -- claim 11 --.

Signed and Sealed this

Sixteenth Day of May, 2006

JON W. DUDAS
*Director of the United States Patent and Trademark Office*